US010956862B2

(12) United States Patent
Danelski (10) Patent No.: US 10,956,862 B2
(45) Date of Patent: *Mar. 23, 2021

(54) PERPETUAL BATCH ORDER FULFILLMENT

(71) Applicant: MATTHEWS INTERNATIONAL CORPORATION, Pittsburgh, PA (US)

(72) Inventor: Darin Danelski, Oconomowoc, WI (US)

(73) Assignee: Matthews International Corporation, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/262,057

(22) Filed: Jan. 30, 2019

(65) Prior Publication Data
US 2020/0005228 A1  Jan. 2, 2020

Related U.S. Application Data

(63) Continuation of application No. 14/451,143, filed on Aug. 4, 2014, now Pat. No. 10,229,383, which is a (Continued)

(51) Int. Cl.
*B65G 1/02* (2006.01)
*G06Q 10/08* (2012.01)
(Continued)

(52) U.S. Cl.
CPC ....... *G06Q 10/087* (2013.01); *G06Q 30/0284* (2013.01); *G06Q 30/06* (2013.01)

(58) Field of Classification Search
CPC ... G06Q 10/087; G06Q 30/0284; G06Q 30/06
See application file for complete search history.

(56) References Cited

U.S. PATENT DOCUMENTS

| 4,002,886 A | 1/1977 | Sundelin |
| 4,331,328 A | 5/1982 | Fasig |

(Continued)

FOREIGN PATENT DOCUMENTS

| CN | 1395199 A | 2/2003 |
| CN | 1396543 A | 2/2003 |

(Continued)

OTHER PUBLICATIONS

Cheney "No Gags in Spencer's Distribution" Jun. 1994, American Shipper 36(6):56-69.

(Continued)

*Primary Examiner* — Talia F Crawley
(74) *Attorney, Agent, or Firm* — Troutman Pepper Hamilton Sanders LLP (57) ABSTRACT

Methods, systems, and devices for implementing and managing order fulfilment processes are generally described. An order fulfilment system may include order management device configured to manage order information associated with a plurality of orders having one or more units orders for the order fulfillment system. The system may also include an order procurement device configured to receive order information from the order management device and to implement the fulfilment of the orders. The order procurement device may transmit completed order information to the order management device. The order management device may assign orders to the order procurement device responsive to receiving an indication that the order procurement device has completed an order. The orders may be assigned based on various order assignment factors, such as travel costs, order ranking, unit characteristics, customer characteristics, or the like.

15 Claims, 6 Drawing Sheets

Related U.S. Application Data continuation of application No. PCT/US2013/024308, filed on Feb. 1, 2013, now Pat. No. 10,229,383.

(60) Provisional application No. 61/863,406, filed on Aug. 7, 2013, provisional application No. 61/595,095, filed on Feb. 5, 2012.

(51) Int. Cl.
*G06Q 30/06* (2012.01)
*G06Q 30/02* (2012.01)

(56) References Cited

U.S. PATENT DOCUMENTS

| | | | |
|---|---|---|---|
| 4,424,082 A | 1/1984 | Rowan | |
| 4,491,982 A | 1/1985 | Candy et al. | |
| 4,500,880 A | 2/1985 | Gomersall et al. | |
| 4,598,275 A | 7/1986 | Ross et al. | |
| 4,792,273 A | 12/1988 | Specht | |
| 4,854,439 A | 8/1989 | Ueda | |
| 4,936,738 A * | 6/1990 | Brennan | B65G 1/02 414/267 |
| 4,962,466 A | 10/1990 | Revesz et al. | |
| 5,151,684 A | 9/1992 | Johnsen | |
| 5,228,558 A | 7/1993 | Hall | |
| 5,260,694 A | 11/1993 | Remahl | |
| 5,271,703 A | 12/1993 | Lindqvist et al. | |
| 5,294,004 A | 3/1994 | Leverett | |
| 5,315,094 A | 5/1994 | Lisy | |
| 5,348,485 A | 9/1994 | Briechle et al. | |
| 5,505,473 A | 4/1996 | Radcliffe | |
| 5,676,514 A | 10/1997 | Higman et al. | |
| 5,730,274 A | 3/1998 | Loomer | |
| 5,781,443 A | 7/1998 | Street et al. | |
| 5,812,986 A | 9/1998 | Danelski | |
| 5,842,555 A | 12/1998 | Gannon et al. | |
| 5,862,907 A | 1/1999 | Taylor | |
| 5,886,634 A | 3/1999 | Muhme | |
| 5,990,437 A | 11/1999 | Coutant et al. | |
| 6,021,888 A | 2/2000 | Itoh et al. | |
| 6,047,812 A | 4/2000 | Horn et al. | |
| 6,205,396 B1 | 3/2001 | Teicher et al. | |
| 6,246,023 B1 | 6/2001 | Kugle | |
| 6,289,260 B1 * | 9/2001 | Bradley | B65G 1/1373 414/273 |
| 6,315,104 B1 | 11/2001 | Ebert | |
| 6,331,437 B1 | 12/2001 | Cohen et al. | |
| 6,377,867 B1 | 4/2002 | Bradley et al. | |
| 6,481,261 B1 | 11/2002 | Ellis | |
| 6,505,093 B1 | 1/2003 | Thatcher et al. | |
| 6,543,693 B1 | 4/2003 | Stern et al. | |
| 6,544,068 B1 | 4/2003 | Hatton | |
| 6,597,969 B2 | 7/2003 | Greenwald et al. | |
| 6,650,225 B2 | 11/2003 | Bastian, II et al. | |
| 6,711,461 B2 | 3/2004 | Flores | |
| 6,729,463 B2 | 5/2004 | Pfeiffer | |
| 6,731,094 B1 | 5/2004 | Itoh et al. | |
| 6,762,382 B1 | 7/2004 | Danelski | |
| 6,762,681 B1 | 7/2004 | Danelski | |
| 6,775,588 B1 | 8/2004 | Peck | |
| 6,820,736 B2 | 11/2004 | Itoh et al. | |
| 6,827,202 B2 | 12/2004 | Topmiller et al. | |
| 6,873,881 B1 | 3/2005 | Schneible, Sr. | |
| 6,879,306 B2 | 4/2005 | Spoonower et al. | |
| 6,971,833 B1 | 12/2005 | Freudelsperger et al. | |
| 6,975,937 B1 * | 12/2005 | Kantarjiev | G06Q 10/08 340/990 |
| 7,084,738 B2 | 8/2006 | Bastian, II | |
| 7,263,409 B2 | 8/2007 | LeVasseur et al. | |
| 7,542,823 B2 | 6/2009 | Nagai | |
| 7,591,365 B2 | 9/2009 | Knepple et al. | |
| 7,591,366 B2 | 9/2009 | Taylor | |
| 7,631,869 B2 | 12/2009 | Bowers et al. | |
| 7,705,742 B1 | 4/2010 | Delaney, III et al. | |
| 7,756,603 B1 | 7/2010 | Delaney, III et al. | |
| 7,905,345 B2 | 3/2011 | Taylor | |
| 7,909,155 B2 | 3/2011 | Lupton et al. | |
| 8,015,079 B2 | 9/2011 | Ramamoorthy et al. | |
| 8,073,562 B2 | 12/2011 | Danelski | |
| 8,676,653 B2 * | 3/2014 | Argue | G06Q 20/047 705/17 |
| 9,697,548 B1 * | 7/2017 | Jaff | G06Q 30/0601 |
| 10,229,383 B2 | 3/2019 | Danelski | |
| 10,235,710 B2 * | 3/2019 | Agasti | G06Q 30/0643 |
| 2002/0174038 A1 | 11/2002 | Chien | |
| 2004/0010337 A1 * | 1/2004 | Mountz | G05D 1/0297 700/214 |
| 2005/0035694 A1 | 2/2005 | Stevens | |
| 2005/0043850 A1 | 2/2005 | Stevens et al. | |
| 2005/0047895 A1 | 3/2005 | Lert, Jr. | |
| 2005/0071234 A1 * | 3/2005 | Schon | G06Q 20/343 705/22 |
| 2005/0140498 A1 | 6/2005 | Bastian, II | |
| 2005/0149226 A1 | 7/2005 | Stevens et al. | |
| 2006/0238307 A1 | 10/2006 | Bauer et al. | |
| 2007/0050258 A1 * | 3/2007 | Dohse | G06Q 30/02 705/14.35 |
| 2007/0210923 A1 | 9/2007 | Butler et al. | |
| 2008/0183256 A1 | 7/2008 | Danelski | |
| 2008/0183328 A1 | 7/2008 | Danelski | |
| 2008/0234853 A1 | 9/2008 | Antonuk et al. | |
| 2008/0270327 A1 | 10/2008 | Freudelsperger | |
| 2009/0074545 A1 * | 3/2009 | Lert, Jr. | B65G 1/0492 414/276 |
| 2009/0173780 A1 | 7/2009 | Ramamoorthy et al. | |
| 2009/0199192 A1 * | 8/2009 | Laithwaite | G06Q 10/06 718/104 |
| 2009/0301839 A1 | 12/2009 | Taylor | |
| 2010/0015925 A1 | 1/2010 | Gruber | |
| 2010/0223781 A1 | 9/2010 | Sumi | |
| 2010/0322473 A1 | 12/2010 | Taylor et al. | |
| 2011/0231272 A1 * | 9/2011 | Englund | G06Q 20/20 705/21 |
| 2012/0022684 A1 | 1/2012 | Hernot | |
| 2012/0024669 A1 | 2/2012 | Danelski et al. | |
| 2012/0150342 A1 | 6/2012 | Song et al. | |
| 2013/0048723 A1 * | 2/2013 | King | G06Q 30/0633 235/383 |
| 2014/0006199 A1 * | 1/2014 | Grigg | G06Q 30/06 705/26.1 |
| 2014/0006224 A1 * | 1/2014 | Grigg | G06Q 10/0837 705/28 |
| 2014/0040050 A1 * | 2/2014 | Argue | G06Q 20/3276 705/16 |
| 2014/0040053 A1 * | 2/2014 | Argue | G06Q 20/3276 705/17 |
| 2014/0040075 A1 * | 2/2014 | Perry | G06Q 30/0635 705/26.81 |
| 2014/0122270 A1 * | 5/2014 | Argue | G06Q 20/047 705/21 |
| 2014/0122276 A1 * | 5/2014 | Argue | G06Q 20/20 705/24 |
| 2014/0343720 A1 | 11/2014 | Danelski | |
| 2014/0351101 A1 | 11/2014 | Danelski | |
| 2015/0026351 A1 * | 1/2015 | Calman | H04L 65/1083 709/227 |
| 2015/0088781 A1 * | 3/2015 | Gillen | G06Q 10/0837 705/340 |
| 2018/0330316 A1 * | 11/2018 | Rajkhowa | G06Q 10/06316 |

FOREIGN PATENT DOCUMENTS

| | | |
|---|---|---|
| CN | 1624715 A | 6/2005 |
| CN | 1817757 A | 8/2006 |
| CN | 101968860 A | 2/2011 |
| CN | 109064081 A | 12/2018 |
| DE | 4000603 A1 | 7/1991 |
| DE | 19947259 C1 | 9/2000 |
| DE | 102006051777 A1 | 5/2008 |
| EP | 2810220 A1 | 12/2014 |

(56) References Cited

FOREIGN PATENT DOCUMENTS

| | | |
|---|---|---|
| EP | 2810225 A1 | 12/2014 |
| EP | 3031016 A2 | 6/2016 |
| FR | 2881663 A1 | 8/2006 |
| JP | H02(1990)-285403 A | 11/1990 |
| JP | H03-(1991)-221359 | 9/1991 |
| JP | 2000-034004 A | 2/2000 |
| JP | 2001-171841 A | 6/2001 |
| JP | 2001-225913 A | 8/2001 |
| JP | 2002-284315 A | 10/2002 |
| JP | 2003-065833 A | 3/2003 |
| JP | 2005-216957 A | 8/2005 |
| JP | 2006-160388 A | 6/2006 |
| JP | 2008-532888 A | 8/2008 |
| JP | 2009-263018 A | 11/2009 |
| JP | 2009-298522 A | 12/2009 |
| JP | 2015506324 A | 3/2015 |
| JP | 2016-533579 A | 10/2016 |
| JP | 6258870 B2 | 1/2018 |
| JP | 2018-76183 A | 5/2018 |
| KR | 20040036899 A | 5/2004 |
| KR | 20060020301 A | 3/2006 |
| WO | 2003007256 A1 | 1/2003 |
| WO | 2012024278 A1 | 2/2012 |
| WO | 2013/16620 A1 | 8/2013 |
| WO | 2013116652 A1 | 8/2013 |
| WO | 2015020976 A1 | 2/2015 |

OTHER PUBLICATIONS

Hitchcock "Paperless Picking Increases Productivity by Over 300%" Jul. 1993, Modern Materials Handling 48 (8):20(30).

International Search Report and Written Opinion for PCT/US14/49638 dated Mar. 12, 2015.

International Search Report and Written Opinion for PCT/US2013/024308 dated May 15, 2013.

International Search Report and Written Opinion for PCT/US2013/024349 dated May 15, 2013.

Supplemental European Search Report and Written Opinion for EP 13743539 dated Aug. 5, 2015.

Supplemental European Search Report and Written Opinion for EP 13744016 dated Aug. 5, 2015.

Supplemental European Search Report and Written Opinion for EP 14758722 dated Dec. 22, 2016.

Supplemental European Search Report and Written Opinion for EP 14759363 dated Aug. 17, 2017.

Wei et al. "Solving the Fixed Shelf Order-Picking Optimization Problem Using the Modified LK Algorithm" Jun. 2004 Computer Applications 24(6):1.

Vargo "Statis, Dynamic and Virtual Batching", Jan. 1, 2012, Vargo Technical Notes, https://vargosolutions.com/wp-content/uploads/2013/01/VASFT004-cover.pdf (Retrieved from Internet Feb. 4, 2020).

* cited by examiner

PERPETUAL BATCH ORDER FULFILLMENT

CROSS REFERENCE TO RELATED APPLICATIONS

This application is a continuation application of U.S. patent application Ser. No. 14/451,143, filed on Aug. 4, 2014, now U.S. Pat. No. 10,229,383, entitled "Perpetual Batch Order Fulfillment," which claims the benefit of U.S. Provisional Application No. 61/863,406 filed Aug. 7, 2013. This application is a continuation application of International Application No. PCT/US2013/024308 filed on Feb. 1, 2013, which claims the benefit of U.S. Provisional Application No. 61/595,095, filed on Feb. 5, 2012. The contents of each of these applications are incorporated by reference in their entirety as if fully set forth herein.

BACKGROUND

Many industries rely on warehouses and distribution centers to store products and fulfill customer orders. One example is the direct-to-consumer (DTC) market in which consumers submit individual purchases to a vendor, such as an e-commerce website operator, who then relies on a distribution center for order fulfillment by direct shipment to the customer. At the distribution center, workers ("pickers") may locate ("pick") ordered products from a storage system ("pick line"), such as a series of shelves, boxes, containers, or the like, and place the products in a cart. The products are then packaged, labeled and shipped directly to the consumer.

Batch picking generally involves picking multiple orders at a time. For instance, a picker may push a mobile cart through a warehouse to pick products associated with multiple orders. The mobile cart may include certain automated features, such as wireless radio frequency (RF) communication elements, that may direct the picker where to go and what to pick in a logical walk sequence. Multiple orders ("N") may be assigned to a cart. Each order may be assigned a designated location on the cart, for example, based on size or other characteristics of the ordered product. A controller (for example, a processor, computer, or the like) may join the orders together, making them one large order or "batch."

A cart may be assigned "N" orders as a batch and a picker may walk a pick line from a start point to an end point picking items as directed by the cart in a walk sequence. After the length of the pick line is completed, "N" orders are completed. The picker may then empty the cart, which can reloaded with "N" new orders and the picking process may be repeated.

In a conventional order fulfillment system, a picker or cart is assigned a finite set of orders that may be received at a time (for example, a cart may only be able to hold three orders). For instance, a picker may be assigned a first, a second and a third order (i.e., N=3), with each order including multiple units to be picked. The picker starts at the starting point of the pick line and picks the units in the set of orders as they travel along the pick path toward the end point of the pick path. When the first, second and third orders are complete, the picker may proceed back to the start, unload the orders, and repeat the process again, for instance, for a fourth, a fifth and a sixth order. At the end of two complete cycles of picking, the picker has completed six orders after walking two times around the pick line.

One limitation of such systems is that they become progressively less efficient as more orders are completed. For example, if a picker starts with "N" orders and progresses along a route eventually completing one of the orders, the batch now becomes a batch of only N-1 orders. This degradation of picker efficiency continues until the batch has only 1 order with the remaining units of the order to be picked. Thus, at the end of one walk through the pick path, the picker has only picked a maximum of "N" orders.

The efficiency of the picking process may be improved by locating warehouse items based on their pick volume. For example, placing the most commonly picked items near the beginning of the pick line may improve the potential that the "N" orders are completed prior to walking the entire pick path, thereby allowing the picker to return to the start point earlier. However, the process of locating high volume items at the front of the pick line is time consuming and labor intensive, and warehouse managers are challenged by moving stock around to maintain a conforming product placement arrangement. Accordingly, a system configured to effectively and efficiently manage the time and effort required to complete a dynamic set of orders would be highly beneficial.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a computer-implemented method for fulfilling batch orders may comprise, by a processor, receiving order information associated with a plurality of orders, receiving order completion information from an order procuring device responsive to completion of an order, and assigning a new order from the plurality of orders to the order procurement component responsive to receiving the order completion information In an embodiment, a batch order fulfillment system may comprise a processor and a non-transitory, computer-readable storage medium in operable communication with the processor. The computer-readable storage medium may contains one or more programming instructions that, when executed, cause the processor to receive order information associated with a plurality of orders, receive order completion information from the order procuring component responsive to completion of an order, and assign a new order from the plurality of orders to the order procurement component responsive to receiving the order completion information.

In an embodiment, an order procurement device may comprise a processor and a non-transitory, computer-readable storage medium in operable communication with the processor. The computer-readable storage medium may contain one or more programming instructions that, when executed, cause the processor to receive order information associated with a plurality of orders assigned to the order procurement device from an order management device, transmit order completion information to the order management device responsive to completing an order from the plurality of orders, and receive a new order from the order management device.

In an embodiment, a computer-readable storage medium may have computer-readable program code configured to implement an order fulfilment process. The computer-readable program code may comprise computer-readable program code configured to receive order information associated with a plurality of orders, receive order completion information from the order procuring component responsive to completion of an order, and assign a new order from the plurality of orders to the order procurement component responsive to receiving the order completion information

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

Figure 1A:
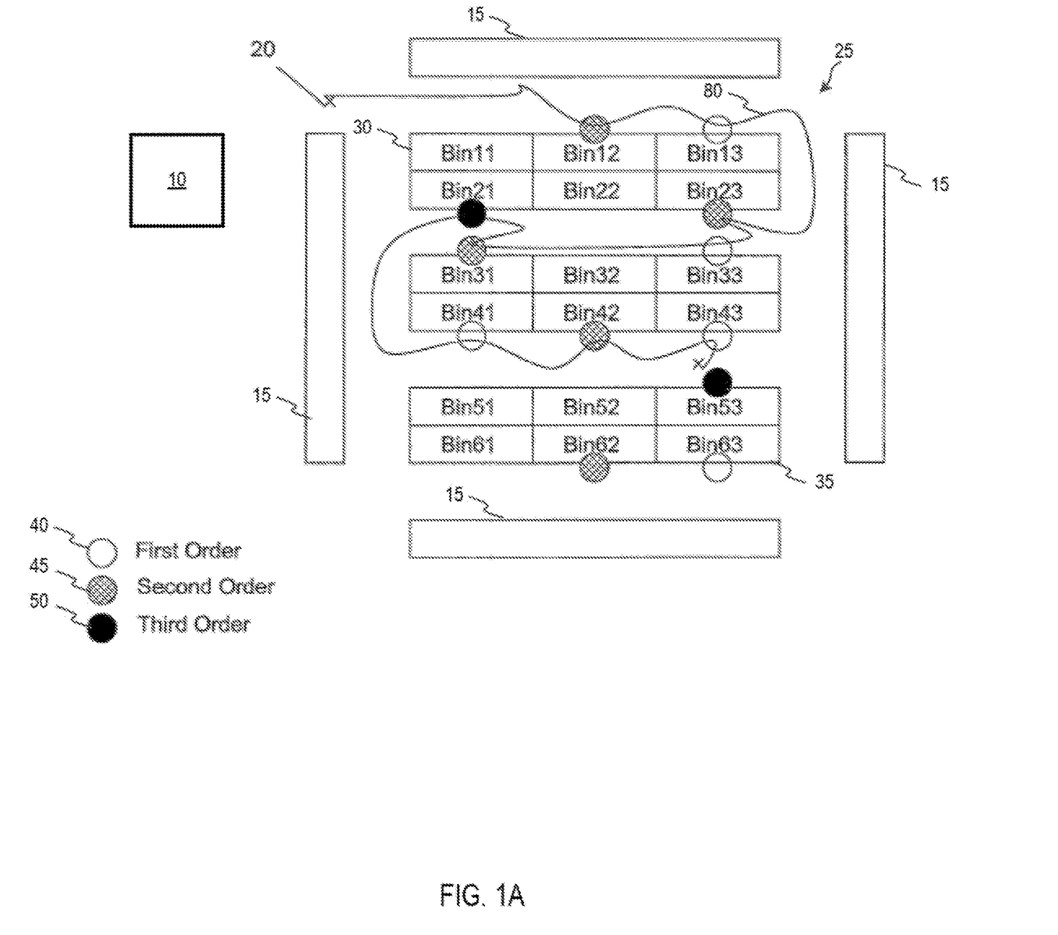
FIGS. 1A-1E illustrate a method of batch order fulfillment according to some embodiments.

FIGS. 1A-1E depict an illustrative order fulfillment system according to some embodiments. As shown in FIG. 1A, the order fulfillment system (the "system") may include an order management device 10 configured to manage order information associated with a plurality of orders having one or more units orders for the order fulfillment system. The system may also include an order procurement device or pick order device 20 configured to receive order information, for example, from the order management device 10. For example, an order may include an order of media product units, such as books, DVDs, or the like. In another example, an order may include a clothing unit, such as a shirt. Embodiments are not limited to any particular orders and/or units, as any type of product, unit and/or order that may operate according to some embodiments is contemplated herein.

Figure 2:
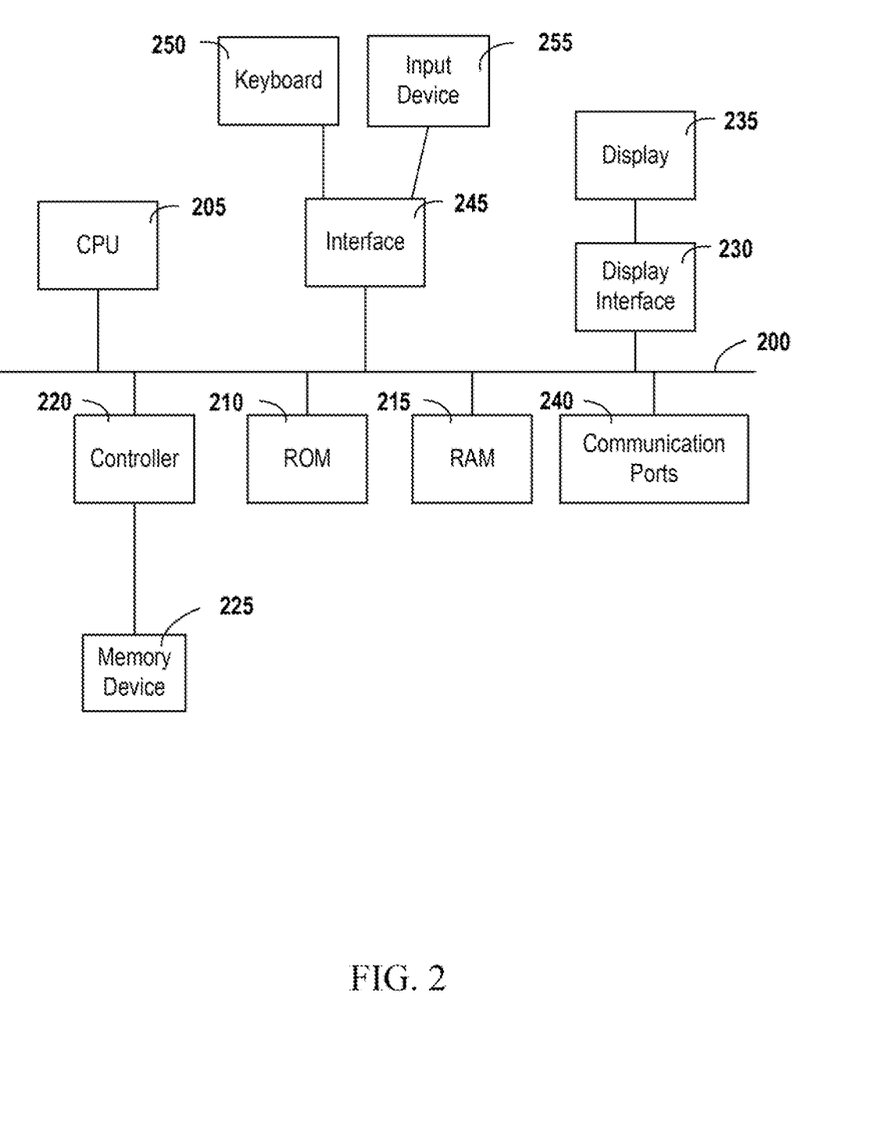
FIG. 2 illustrates various embodiments of a computing device for implementing the various methods and processes described herein.

In an embodiment, the order management device 10 and/or the order procurement device or pick order device 20 may include a logic device which may generally include a processor, a non-transitory memory or other storage device for housing programming instructions, data or information regarding one or more applications, and other hardware, including, for example, the central processing unit (CPU) 205, read only memory (ROM) 210, random access memory 215, communication ports 240, controller 220, and/or memory device 225 depicted in FIG. 2 and described below in reference thereto. The order management device 10 and/or the pick order device 20 may include, without limitation, a server computing device, a personal computer (PC), a kiosk computing device, a wall-mounted computing device, a mobile computing device, such as a laptop computer, smartphone, personal digital assistant (PDA), tablet computing device, or any other logic and/or computing device now known or developed in the future. Although the order management device 10 and the pick order device 20 are described as separate devices herein, embodiments are not so limited. For example, in some embodiments, the order management device 10 and the pick order device 20 may be a single device, such as a single computing device. In such embodiments, the order management device 10 and the pick order device 20 may include separate elements and/or hardware/software functionality of a single device. In another example, the order management device 10 may be a computing device installed in or otherwise connected to the pick order device 20.

The order management device 10 and/or the order procurement device or pick order device 20 (referred to hereinafter as the "pick order device") may be configured to communicate using various communication protocols known to those having ordinary skill in the art. Illustrative and non-restrictive examples of communication protocols include wired and wireless communication protocols, Ethernet, Wi-Fi, infrared, Bluetooth, universal serial bus (USB), local area network (LAN), wide area network (WAN), and/or over the Internet.

In an embodiment, the order management device 10 may execute an order management application configured to generate order information associated with orders received by the system. The order management application may be configured to assign orders to the pick order device 20 and to receive status information therefrom, such as which units and/or orders have been picked by the pick order device. The order management application may be configured to access unit or order information associated with the units or orders (for instance, products) available within the system, such as stock keeping units (SKUs), radio-frequency identification (RFID) information, bar code information, location, number, distance between different unit locations, or the like. In this manner, the order management application may be configured to assign orders to the pick order device 20 based on the order information. For example, the order management application may assign orders to the pick order device 20 to minimize the distance the pick order device has to travel to complete an order based on the current orders assigned to the pick order device.

The order management application may assign orders to the pick order device 20 based on various factors (the "order assignment factors"), including, without limitation, travel distance and/or time ("travel costs"), random assignment, order ranking (for example, which orders need to be completed first), first-in-first-out, unit characteristics (for example, common SKU numbers), order characteristics (for example, larger orders last, single orders first, or the like), customer characteristics (for example, large volume customers first, longest shipping distance first, or the like), any other factor that may have an effect on selecting an order, and/or any combination thereof. In some embodiments, the order assignment factors may include the fullness level of the pick order device 20. For example, if the order procurement device is full or substantially full (for instance, cannot hold any more units or a threshold number of units), an order may be assigned adjacent to and/or along the path of a completed order queue.

In some embodiments, the order management application may be configured to assign weights or a priority to the order assignment factors. In some embodiments, the order management application may be configured to dynamically evaluate each new order or batch, for example, in view of the current set of orders and/or batches, based on the order assignment factors and any weighting or prioritizing thereof and assign orders accordingly.

In some embodiments, the pick order device 20 may include a device used by a picker as they walk around the pick line 25 to complete orders. For example, the pick order device 20 may include a mobile computing device configured to display order information on a display component. In some embodiments, the pick order device 20 may include an automated device configured to move around the pick line 25 on a track, conveyor, on wheels, or the like. In some embodiments, the pick order device 20 may include an automated cart or other device configured to automatically move through a pick line 25 and access units for assigned orders, with or without employee assistance (an "automated pick order device" or "automated order procurement device"). In some embodiments, the pick order device 20 may include a cart configured to be pushed by an employee having a display device for displaying orders. In some embodiments, the pick order device 20 may include various elements configured to reach and grasp units to place the units in the cart or to make them accessible to a worker. In some embodiments, the pick order device 20 may include various containers, bins, or the like for storing units associated with orders. As such, a pick order device 20 according to some embodiments may be limited to storing a finite number of orders at a time.

The pick order device 20 may be configured to execute an order picking application configured to receive order information associated with a plurality of orders, for example, from the order management device 10. In some embodiments, the order picking application may be a client application, module, routine, or other component of the order management application. In an embodiment, the order picking application may be configured to display order information, such as units associated with the order, the sequence of the order in relation to other orders, order identification information, or the like. In another embodiment, the order picking application may be configured to move or otherwise operate the order picking device 20 to locate a unit and/or to place a unit for storage by the order picking device.

As shown in FIG. 1A, a pick order device 20 may be assigned a first order 40, a second order 45 and a third order 50. Each order 40, 45, 50 may include multiple units to be picked from bins 11, 12, 13, 21, 22, 23, 31, 32, 33, 41, 42, 43, 51, 52, 53, 61, 62, 63 located within a pick line 25. From the starting point 30 to an end point 35, the pick order device 20 may locate units to be picked by travelling along the pick path 80, for instance, automatically or with the assistance of a worker, until one of the orders is completed. In this case, the third order 50 may be completed when an item is picked from bin 53. Although the pick line 25 is depicted as having a starting point 30 and an end point 35, embodiments are not so limited, as the pick line may not include a starting point and an end point.

According to some embodiments, completed orders may be deposited into a completed order queue 15, which may be located in various locations within the system. The completed order queue 15 include a conveyer belt, containers, platforms, or other components that may receive and/or process units for shipping, labelling, processing, inspection, packaging, or the like. As such, completed orders may be deposited onto the completed order queue 15 as the pick order device 20 moves about the system. In an embodiment, the completed order queue 15 may be accessible from various locations from within the system, including, without limitation, at the end of each aisle of the pick line 25, at the start of the pick line, at the end of the pick line, in the middle of the pick line, or any combination thereof.

Figure 1B:
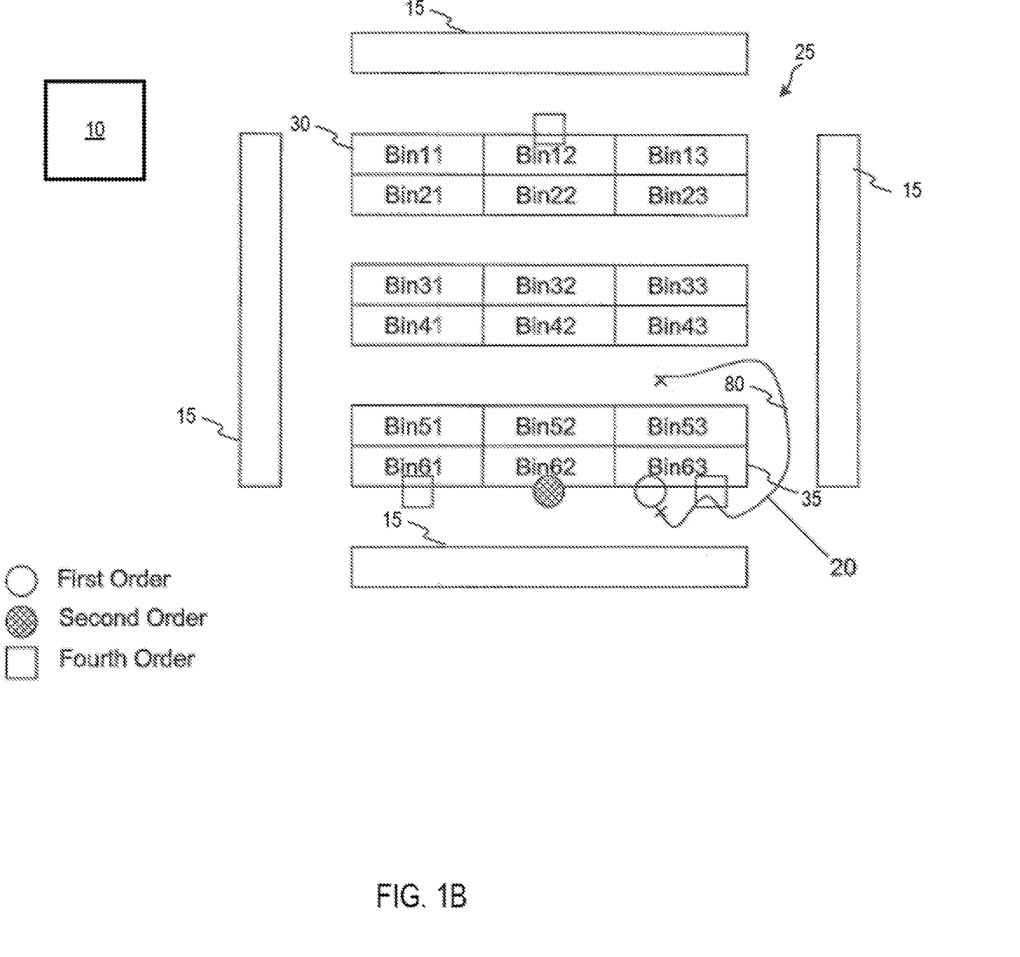

As shown in FIG. 1B, the pick order device 20 may receive order information assigning a new order, for example, a fourth order 65, to the pick order device. The order picking application may be configured to communicate order completion information to the order management device 10. For example, the pick order device 20 may include or may present on a display component buttons that may be selected by a worker to indicate that a unit and/or an order has been located and/or completed. For example, the worker may select an "order complete" or "unit complete" button, along with the entry of any required information when a unit is selected or an order is complete. In another example, the pick order device 20 may be configured to automatically detect and/or transmit the order completion information to the order management device 10. For example, the pick order device 20 may include a component configured to manually and/or automatically receive information about the order, such as a bar code scanner, an RFID reader, or the like. The order completion information may include an order identifier, a unit identifier, location information (for example, a location of the pick order device 20), or the like. The order management application may use the order completion information to determine that the pick order device 20 may be able to accept a new order and may assign a new order based on the order information and/or the order completion information.

Figure 1C:
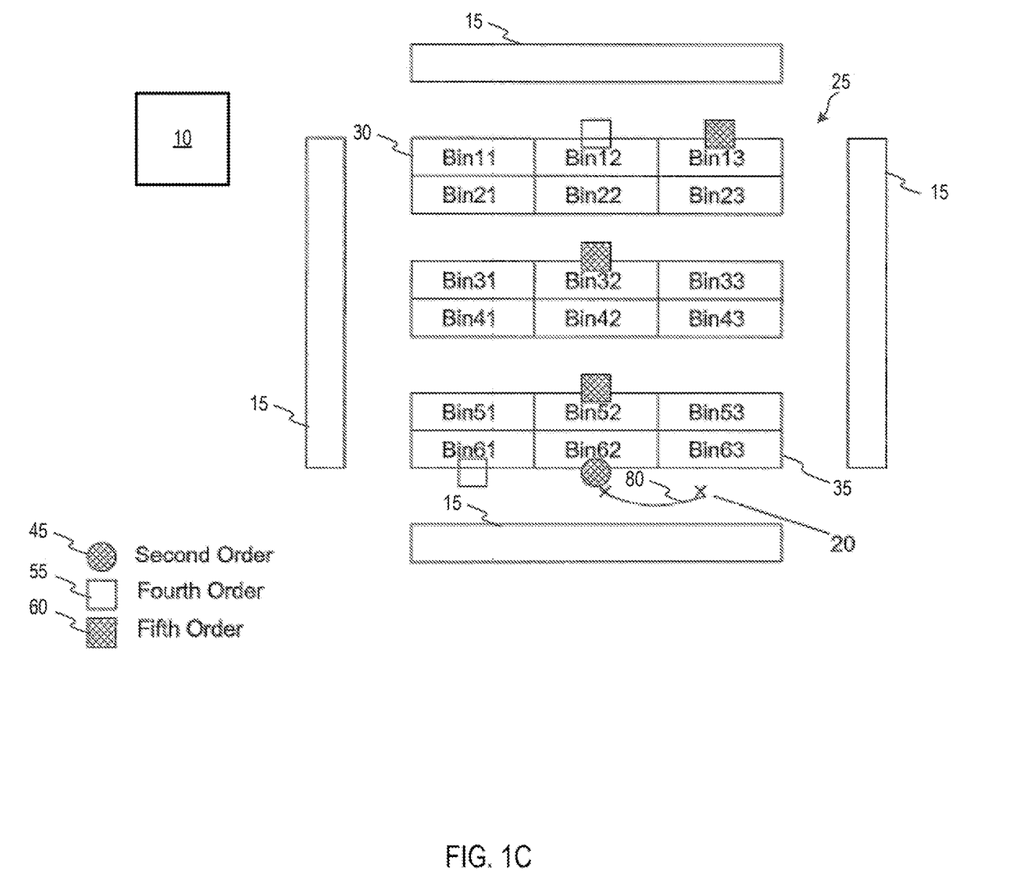
Figure 1D:
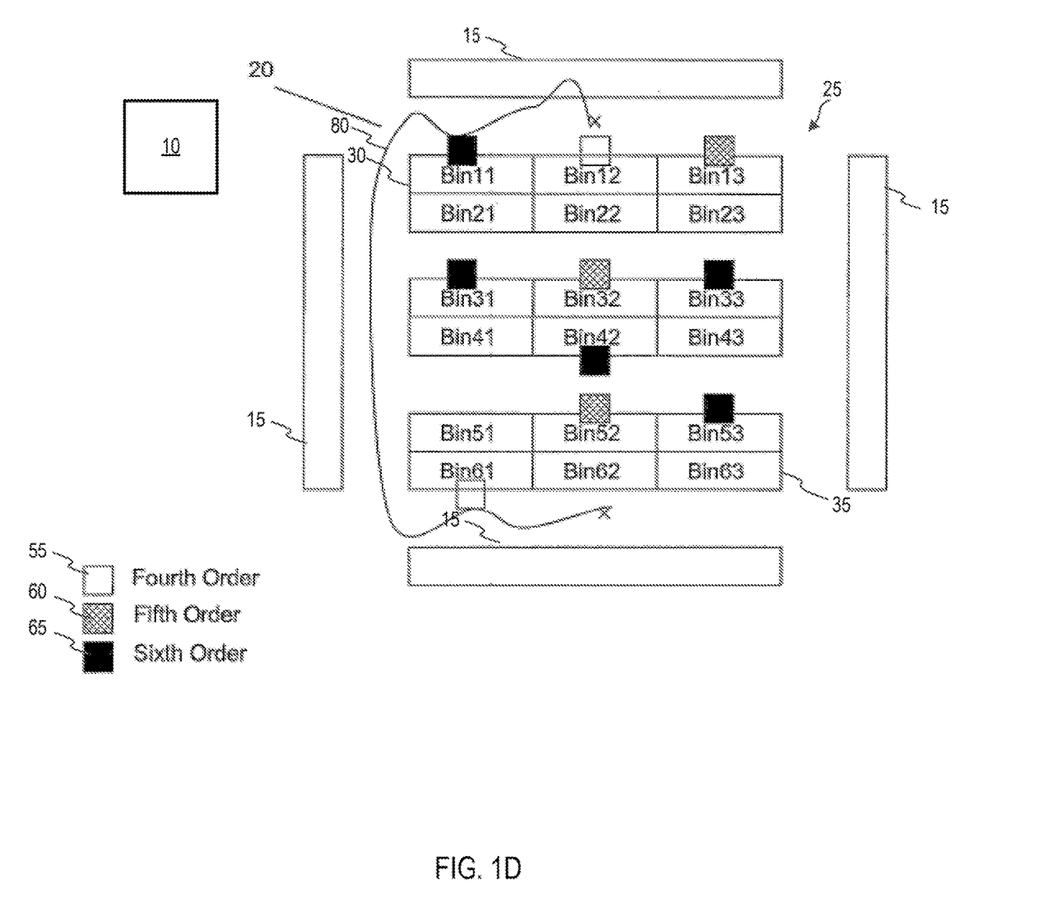
Figure 1E:
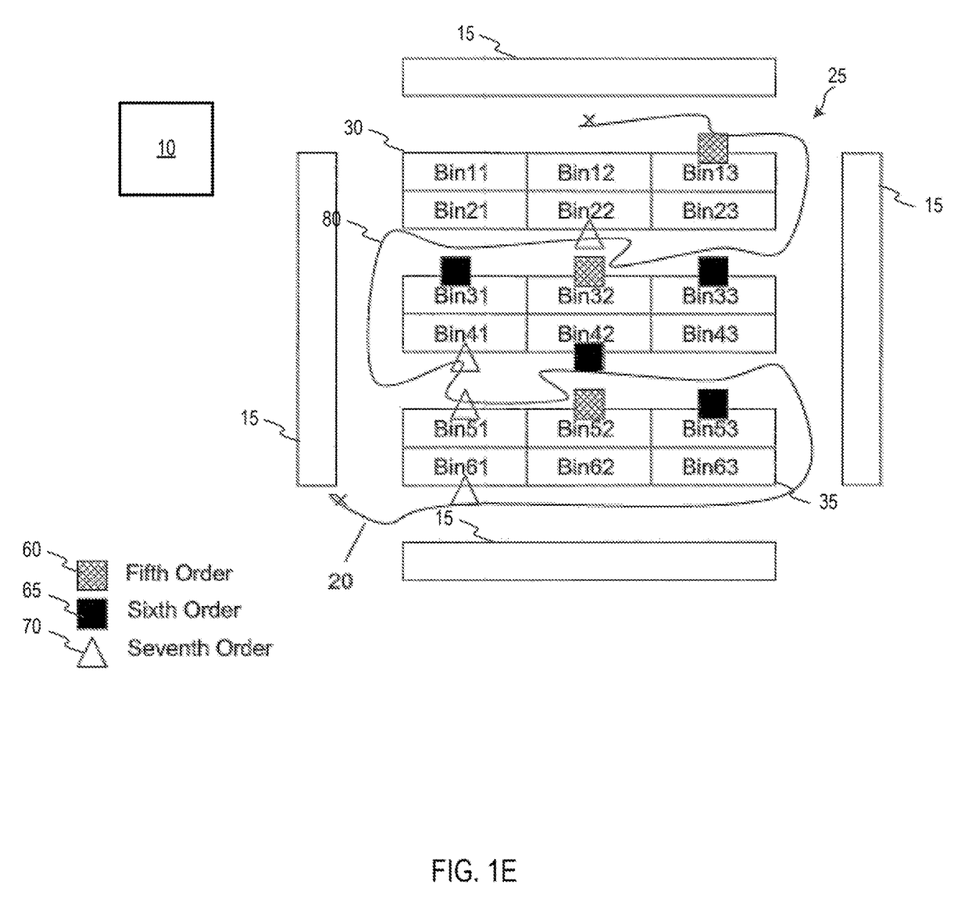

The pick order device 20 may continue travelling along the pick path 80 while picking the first order 40, the second order 45 and the fourth order 55. References herein to the pick order device 20 may generally refer to a pick order device (such as a cart or other movable equipment) moving through the system (automatically or manually) or to a worker associated with a pick order device (such as a mobile computing device) who is moving within the system based on information provided by the pick order device and may be carrying the pick order device. In this case, the first order 40 may be completed when an item is picked from bin 63. Referring now to FIG. 1C, the picker 20 may be assigned another new order, a fifth order 70. The picker 20 may continue to travel along the pick path 80 while picking the second order 45, the fourth order 55, and the fifth order 60 until one of the orders is completed. The second order 45 may be completed when an item is picked from bin 62. As shown in FIG. 1D, the picker 20 may be assigned a sixth order 65 and may continue travelling along the pick path 80 while picking the fourth order 55, the fifth order 60, and the sixth order 65 until one of the orders is completed. The fourth order 55 may be completed when an item is picked from bin 12. The picker 20 may be assigned a seventh order 70 responsive to completion of the fourth order 55 as depicted in FIG. 1E. The picker 20 may continue travelling along the pick path 80 while picking the fifth order 60, the sixth order 65 and the seventh order 70. At the end of two complete cycles through the pick line 25 according to some embodiments as depicted in FIGS. 1A-1E, the picker 20 may be able to complete at least seven orders 40, 45, 50, 55, 60, 65, 70 after walking two times around the pick path.

According to some embodiments, units may be selected by the pick order device 20 in any sequence, such as a sequence that minimizes the travel costs associated with picking the orders. For example, the pick order device 20 may pick the units for one order to the exclusion of units for other orders, that is, working on one order at a time before moving on to the next order). In another example, the pick order device 20 may be configured to select the next available unit regardless of the order.

The order management application may be configured to use the order information (for example, the location of each unit), the order information (for example, which units are in each order, which orders are assigned to the pick order device 20), and/or the location of the pick order device to determine which order to assign to the pick order device 20. The order management application may calculate travel costs for each order dynamically at any point in time based on the order information, the order information, and the location of the pick order device 20. In some embodiments, the order management application may assign new orders based on the next available order with the lowest travel costs (for example, the lowest travel distance and/or travel time). In some embodiments, the order management application may assign new orders based on the lowest travel costs and the order assignment factors.

In an embodiment, the order management application may receive information associated with the load of the pick order device 20, including any single unit compartments as described below, having a finite number of storage locations for units. In such an embodiment, the order management application and/or the order picking application may monitor the load of the pick order device 20. As such, the order management application may assign an order based on the pick order device 20 proximity to a completed order queue 15. As such, the order management application may assign an order such that the order picking device 20 may travel toward the unit on the way to a completed order queue 15 to unload completed orders. In an embodiment, the order management application may handle orders in which the number of units for the order is greater than the number of available compartments for the order picking device 20. In such an embodiment, the order management application may configure the order such that the order picking device 20 is in proximity to a completed order queue 15 when the available compartments are full of the units so that the order picking device 20 may efficiently handle the order.

The "perpetual batch" system depicted in FIGS. 1A-1E provides for order completion and new order assignment at varying points along the pick line 25 such that the pick order device 20 and the overall order fulfillment process maintains efficiency as orders are completed. As such, a pick order device 20 or a worker with a pick order device may complete more orders than a conventional system while traversing the same distance. In addition, a pick order device 20 or a worker with a pick order device may be able to move through the system with a continuous supply of orders.

It will be understood that the above described method is one embodiment and that the systems and methods of batch order fulfillment described herein may include variations from the above description as well as additional features, some of which are described below.

Although the system depicted in FIGS. 1A-1E shows a pick line 20 having bins 11, 12, 13, 21, 22, 23, 31, 32, 33, 41, 42, 43, 51, 52, 53, 61, 62, 63 arranged in aisles having a start point 30 and an end point 35, embodiments are not so limited as any other type of arrangement that may operate according to some embodiments is contemplated herein. In some embodiments, a physical pick line 20 consisting of aisles may be conceptualized by the order picking application and/or the order management application as other types of configurations, such as circles, squares, or the like. In some embodiments, the pick line 20 may not have a designated start point 30 and/or end point 35.

For example, the pick line 20 depicted in FIGS. 1A-1E may be conceptualized as a virtual "circle". The pick line 20 represents a pick path 80 that ends where it begins, and thus the pick line can be exploded into a theoretical circle. Each pick location in the pick line may be represented in degrees or radians on a circle of circumference 'C', where "C" represents the distance required to travel the entire pick path. Each location may represent a specific angle on this circle. The distance between pick locations may then be represented by the difference between the current location angle on the circle and the angle of the pick location(s).

When no orders are assigned to a batch, the system, through the order management device 10, may review every order in a queue of pending orders and determine a distance factor based on the current location of the pick order device 20. The distance factor may represent the distance along the pick path 20 required to complete the order from the current location of the pick order device 20 on the pick path. According to some embodiments, the order with the lowest distance factor may be added to the batch.

In the case of a pick order device 20 with no orders configured to handle "N" orders, the "N" orders with the smallest distance factor may be added to the batch, for example, based on their rankings from shortest to longest. Thus, the first order 40 would be the order with the smallest distance to travel from the current location and thus would be the first order to be completed. Accordingly, the third order 50 would not be completed before first order, as was described in the description of FIGS. 1A-1E above. In an embodiment, the direction of movement around the pick circle may be in the same direction. In such an embodiment, orders are selected such that the pick order device 20 does not move backward on the pick line 25. In another embodiment, the pick order device 20 may move in more than one direction around the pick circle.

In an embodiment in which the system includes a start point 30 and an end point 35, the pick order device 20 may be configured or instructed (for example, by the order picking application) to move from the start point forward toward the end point. In an embodiment, when the pick order device 20 reaches the end point 35 or the last unit in the pick line 25 before the end point the pick order device may reverse direction and move in a direction toward the start point 30. In such an embodiment, the start point 30 and the end point 35 effectively switch with each pass through the pick line 25. In another embodiment, when the pick order device 20 reaches the end point 35 or the last unit in the pick line 25 before the end point, the pick order device may return to the start point and traverse the pick line again in a direction toward the end point.

The order management application may be configured to assign orders to the pick order device 20 in order to minimize travel costs based on the travel pattern of the pick order device through the pick line, such as the two travel patterns described above. Referring to FIG. 1A, if the pick order device 20 has reached the end point 35, the order management application may assign an order having a unit at bin 11 if the pick order device is configured or instructed to return to the start point 30 and move in a direction toward the end point. In contrast, if the pick order device is configured or instructed to move in a direction toward the start point 30 from the end point 35, the order management application may be configured to assign an order with a unit in bin 51.

Once the pick order device 20 is in operation and new orders are being assigned to the batch, it is possible for newly added orders to be completed before older orders. According to some embodiments, the set of assigned orders is dynamically changing based on orders being received from customers throughout the day and, as such, the pending pool of orders is dynamic and not a fixed order queue.

According to some embodiments, the pick order device 20 may be configured as a radio frequency (RF) device and/or cart ("RF cart"). In an embodiment, the RF cart may be a paperless order fulfillment system that utilizes hardware mounted to a mobile cart. An RF cart may provide a method of picking multiple orders at a time on a single pass through the warehouse, making order pickers more accurate and productive. An RF cart may be computer controlled and communicate with a centralized computer system, such as the order management device 10, via an RF network, providing real-time response and reporting. The system may be configured to direct pickers to warehouse pick locations in the most efficient route, minimizing walk distance while fulfilling multiple orders at once. However, as described above, embodiments are not limited to RF carts, as any type of pick order device configured to operate according to some embodiments is contemplated herein, including RF terminals, voice recognition systems, or pick sleds that travel on tracks or conveyer systems.

The pick order device 20 may operate as a guidance system that directs the picker to units in a logical travel sequence that generally minimizes a travel time and/or distance of the pick order device 20. The guidance system may include a system for directing the pick order device 20 or a worker associated with the pick order device, for example, audibly or visually. In an embodiment, the pick order device 20 may include a system for controlling the movement of a vehicle or cart associated with a the pick order device or a worker associated with the pick order device may control the movement of the pick order device.

In an embodiment, the order management application may control the picking process to create batches of orders for the pick order device 20. In an embodiment, the orders may be assigned randomly or by using commonality algorithms. In another embodiment, the orders may be assigned based on, among other things, an increase in the travel time resulting from assigning the new order to the picker, the minimum travel distance and/or time from the current point on the pick path, or a combination thereof. Accordingly, the order management application may assign orders to the pick order device 20 based on finding orders that can be completed with a minimum amount of travel from the current pick order device position or from the last picked item position.

In an embodiment, the pick line 25 may not include a dedicated start point 30 and/or end point 35. In such an embodiment, a plurality of pick order devices 20 may be scattered at various locations throughout a pick line 25. The order management application may be configured to assign orders with such a distribution of pick order devices 20 to avoid collision and passing requirements necessitated when multiple pickers are traversing a pick line simultaneously. In the case of multiple pick order devices 20, at the beginning of the picking process, for each cart in the system, the order management application may select "N" orders corresponding to the number of order locations on the cart and/or on the "N" orders that can be completed in the shortest travel distance or shortest travel time ("travel costs"). The pick order device 20 may procure units until an order is complete. The order may be removed and placed in a completed order queue, either on the cart, or on a conveyor that transports the order to a shipping area. The order management application may then determine, from all available orders, the order which may be completed in the least travel distance or least travel time ("lowest travel cost order"). The lowest travel cost order may be assigned to the freed location and picking continues. The process of replacing completed orders with new orders that can be picked with the lowest travel costs may continue, for example, until all orders are completed. Accordingly, "M" pick order devices 20 are always picking "N" orders at a time According to some embodiments, the system may be configured to handle "single unit orders." In many direct-to-consumer (DTC) order fulfillment operations, the order quantity is often a single unit. In an embodiment, a single storage location on the pick order device 20 and/or cart, sled, or the like associated with the pick order device may be dedicated to receiving single orders. Any order in the system that is a single unit may be dynamically assigned to each individual batch if that item resides between the current location on the pick line 25 and the next batch pick location. In an embodiment, single unit orders may be added to any pick order device 20 and/or cart, sled, or the like associated with the pick order device that is passing or is within a threshold distance from passing pick line 25 location where the single unit is being stored. In an embodiment, when the single unit order location on the pick order device 20 and/or cart, sled, or the like associated with the pick order device fills, the single unit orders may be removed and sent to a secondary processing station where each item is removed and assigned to an order dynamically. As each of these orders is completed as a single unit, no order integrity is required until it arrives at the secondary processing (shipping) station.

In an example of single unit order shipping, a bin, box, or other storage medium containing batch picked single unit orders may be removed from a pick order device 20 and/or cart, sled, or the like associated with the pick order device and delivered to a shipping station. This station may include a computer, monitor (often touch screen), bar code scanner, label printer, and a scale. Since every item in the storage medium represents a unique and individual order, each item is a shipment in itself. An operator and/or automated equipment at the shipping station may remove a unit from the container, scan the unit with an identifying bar code, places the unit into a shipping container or envelope, and places the item on a scale. A shipping application, which may include or may communicate with the order management application, may find a pending (queued) order that required only that item (for example, based on the SKU) from its database, calculate shipping costs, and print both a shipping label and a packing slip for that order.

The term "walking" or "walk" as used herein may generally refer to picking operations, for example, because picking operations often include carts that are pushed through a pick line manually, and hence, the picker is walking. Embodiments are not limited to circumstances where carts are used or where walking is required as embodiments apply to any situation that utilizes any form of batch picking, whether automated or manual. Also, embodiments are not limited to the use of batch pick carts, as any other type of component or device may be used according to some embodiments provided herein, for example, a conveyor, automatic guided vehicle, conveyed sled, or other suitable transportation device.

According to some embodiments, a batch fulfillment system may include a loop sorter including a component for moving units for placement in a set of boxes. In a conventional loop sorter, the boxes are removed from the loop sorting area responsive to a threshold number of the boxes being filled. Typically, the boxes are not removed until all of them are full. As such, there are transaction costs when the number of boxes available descends toward the threshold and, in many cases, the system must stop or slow down to allow for the removal of the boxes. In an embodiment, as each box and/or each set of boxes associated with an order is filled a signal is sent to the order management application to remove the box. In this manner, a "perpetual" loop sorter may be configured in which there are a number of available boxes that equals or substantially equals the number of boxes in the set.

FIG. 2 depicts a block diagram of exemplary internal hardware that may be used to contain or implement the various computer processes and systems as discussed above. A bus 200 serves as the main information highway interconnecting the other illustrated components of the hardware. CPU 205 is the central processing unit of the system, performing calculations and logic operations required to execute a program. CPU 205, alone or in conjunction with one or more of the other elements disclosed in FIG. 2, is an exemplary processing device, computing device or processor as such terms are used within this disclosure. Read only memory (ROM) 230 and random access memory (RAM) 235 constitute exemplary memory devices.

A controller 220 interfaces with one or more optional memory devices 225 to the system bus 200. These memory devices 225 may include, for example, an external or internal DVD drive, a CD ROM drive, a hard drive, flash memory, a USB drive or the like. As indicated previously, these various drives and controllers are optional devices. Additionally, the memory devices 225 may be configured to include individual files for storing any software modules or instructions, auxiliary data, common files for storing groups of results or auxiliary, or one or more databases for storing the result information, auxiliary data, and related information as discussed above. For example, the memory devices 225 may be configured to store judicial information source 215.

Program instructions, software or interactive modules for performing any of the functional steps associated with the steps, applications, or the like described above may be stored in the ROM 230 and/or the RAM 235. Optionally, the program instructions may be stored on a tangible computer-readable medium such as a compact disk, a digital disk, flash memory, a memory card, a USB drive, an optical disc storage medium, such as a Blu-ray™ disc, and/or other recording medium.

An optional display interface 230 may permit information from the bus 200 to be displayed on the display 235 in audio, visual, graphic or alphanumeric format. The information may include information related to a current job ticket and associated tasks. Communication with external devices may occur using various communication ports 240. An exemplary communication port 240 may be attached to a communications network, such as the Internet or a local area network.

The hardware may also include an interface 245 which allows for receipt of data from input devices such as a keyboard 250 or other input device 255 such as a mouse, a joystick, a touch screen, a remote control, a pointing device, a video input device and/or an audio input device.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to"). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example), the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, or the like. As a non-limiting example, each range discussed herein can be readily broken down into a lower third, a middle third, and an upper third. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A computer-implemented method of batch order fulfillment, the method comprising, by a processor:
receiving order information associated with a plurality of orders, each of the plurality of orders indicating at least one of a plurality of units arranged in one of a plurality of containers or storage areas;
assigning, via an order management device, a batch of orders to an order procurement device configured to move about the plurality of containers or storage areas and configured to receive information about the order through a component selected from a bar code scanner and a radio-frequency identification reader;
receiving order completion information at the order management device from the order procurement device responsive to completion of an order;
receiving a location of the order procurement device following completion of the order;
determining a plurality of distances between the order procurement device and at least two of the plurality of units associated with the plurality of orders based on the location;
assigning, via the order management device, a new order from the plurality of orders to the batch of orders prior to a completion of the batch of orders and responsive to receiving the order completion information, the new order comprising a unit having a minimum distance of the plurality of distances, wherein the order procurement device picks units of the new order and unpicked units of the assigned batch of orders that have not been completed in a logical travel sequence that minimizes travel cost of the order procurement device, wherein travel cost comprises travel time and travel distance;
adding at least one signal unit order to any order procurement device; and
removing and sending the at least one single unit order to a processing station where each item of the at least one single unit order is removed and assigned to an order dynamically.

2. The method of claim 1, wherein assigning the new order further comprises assigning the new order based on at least one order assignment factor.

3. The method of claim 2, wherein the at least one order assignment factor comprises at least one of a travel cost, an order ranking, a first-in-first-out order, a unit characteristic, an order characteristic, and a customer characteristic.

4. The method of claim 2, wherein the at least one order assignment factor comprises a plurality of weighted order assignment factors.

5. The method of claim 1, wherein the order information comprises at least one of a stock keeping unit (SKU), radio-frequency identification (RFID) information, bar code information, location information, order number, and a distance between different orders.

6. The method of claim 1, further comprising determining a travel cost for each of the plurality of orders based on the order information and the location following completion of the order.

7. The method of claim 6, wherein assigning a new order further comprises assigning an order based on a minimum travel cost.

8. The method of claim 1, wherein the order procurement device comprises at least one of a cart and a sled.

9. A batch order fulfillment system, comprising:
a plurality of containers or storage areas;
an order procurement device configured to move about the plurality of containers or storage areas and configured to receive information about the order through a component selected from a bar code scanner and a radio-frequency identification reader;
an order management device comprising a processor; and a non-transitory, computer-readable storage medium in operable communication with the processor, wherein the computer-readable storage medium contains one or more programming instructions that, when executed, cause the processor to:
receive order information associated with a plurality of orders, each of the plurality of orders indicating at least one unit arranged in one of the plurality of containers,
assign a batch of orders to the order procurement device,
receive order completion information from the order procurement device responsive to completion of an order,
receive a location of the order procurement device following completion of the order,
determine a plurality of distances between the order procurement device and at least two of the plurality of units associated with the plurality of orders based on the location,
assign a new order from the plurality of orders to the batch of orders prior to a completion of the batch of orders and responsive to receiving the order completion information, the new order comprising a unit having a minimum distance of the plurality of distances, wherein the order procurement device picks units of the new order and unpicked units of the assigned batch of orders that have not been completed in a logical travel sequence that minimizes travel cost of the order procurement device, wherein travel cost comprises travel time and travel distance; adding at least one single unit order to any order procurement device; and
removing and sending the at least one single unit order to a processing station where each item of the at least one single unit order is removed and assigned to an order dynamically.

10. The system of claim 9, wherein assigning the new order further comprises assigning the new order based on at least one order assignment factor.

11. The system of claim 10, wherein the at least one order assignment factor comprises at least one of a travel cost, an order ranking, a first-in-first-out order, a unit characteristic, an order characteristic, and a customer characteristic.

12. The system of claim 10, wherein the at least one order assignment factor comprises a plurality of weighted order assignment factors.

13. The system of claim 9, wherein the order information comprises at least one of a stock keeping unit (SKU), radio-frequency identification (RFID) information, bar code information, location information, order number, and a distance between different orders.

14. The system of claim 9, wherein the computer-readable storage medium further contains one or more programming instructions that, when executed, cause the processor to determine a travel cost for each of the plurality of orders based on the order information and the location following completion of the order.

15. The system of claim 14, wherein assigning the new order further comprises assigning the new order based on a minimum travel cost.

* * * * *